(12) United States Patent
Gosinski

(10) Patent No.: US 6,820,638 B1
(45) Date of Patent: Nov. 23, 2004

(54) AIR MANIFOLD APPARATUS

(75) Inventor: John R. Gosinski, Jackson, MI (US)

(73) Assignee: J.G.T.W. Enterprises, L.L.C., Jackson, MI (US)

(*) Notice: Subject to any disclaimer, the term of this patent is extended or adjusted under 35 U.S.C. 154(b) by 0 days.

(21) Appl. No.: 10/411,492

(22) Filed: Apr. 10, 2003

Related U.S. Application Data

(60) Provisional application No. 60/372,517, filed on Apr. 12, 2002.

(51) Int. Cl.[7] .............................. F16K 27/08; F16L 3/00
(52) U.S. Cl. .................. 137/377; 137/561 A; 137/343; 137/383
(58) Field of Search ............................. 137/561 A, 377, 137/343, 383

(56) References Cited

U.S. PATENT DOCUMENTS

| | | | | |
|---|---|---|---|---|
| 2,490,839 A | * | 12/1949 | Shaffer et al. | 48/190 |
| 2,598,961 A | * | 6/1952 | Andrus | 137/883 |
| 2,652,069 A | * | 9/1953 | Goheen | 137/271 |
| 2,826,354 A | * | 3/1958 | Field | 137/899.4 |
| 5,038,819 A | * | 8/1991 | Sutphen | 137/343 |
| 5,261,704 A | | 11/1993 | Araujo et al. | |
| 5,361,798 A | * | 11/1994 | Beckstrom | 137/343 |
| 5,399,072 A | * | 3/1995 | Westphal | 417/234 |
| 5,884,659 A | * | 3/1999 | Prosser et al. | 137/587 |

* cited by examiner

*Primary Examiner*—A. Michael Chambers
(74) *Attorney, Agent, or Firm*—Young & Basile, P.C.

(57) ABSTRACT

An air manifold apparatus for supplying pressurized air to a plurality of air lines having an enclosure with an air inlet for receiving pressurized air from a pressurized air source and a plurality of air outlets for providing pressurized air to a plurality of air lines. The inlet and the outlets are each connectable to an air hose connector for communicating pressurized air between the enclosure and the air lines. A plurality of U-shaped bars are connected to the ends of the enclosure and extend outwardly away from the enclosure to protect the air hose connectors from damage and to act as a handle and a stand for the air manifold apparatus.

19 Claims, 2 Drawing Sheets

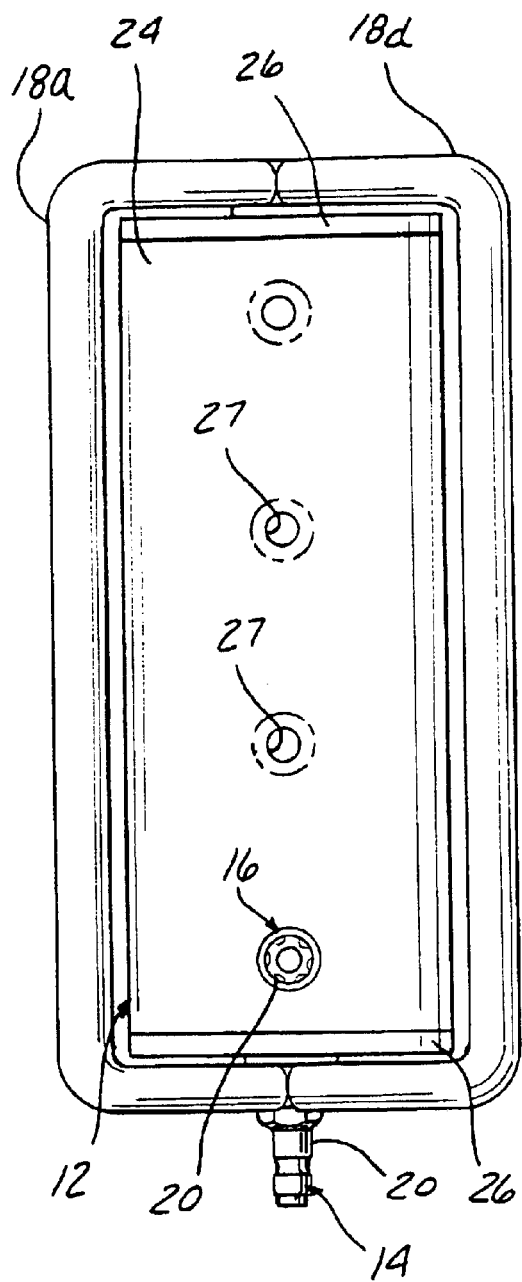
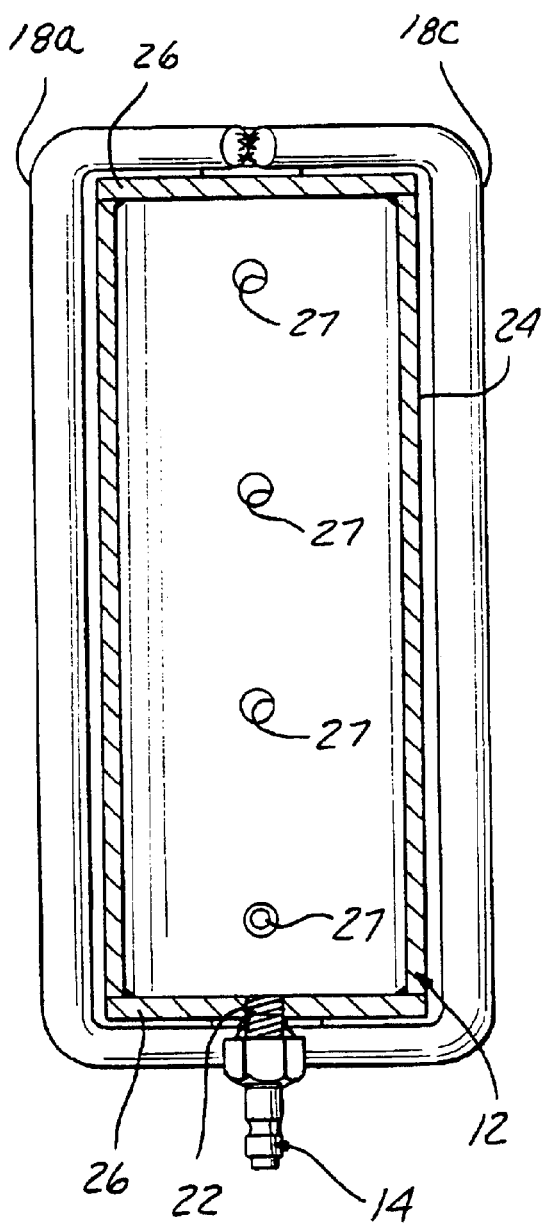
FIG. 3
FIG. 4

AIR MANIFOLD APPARATUS

The following is a formalization of U.S. Provisional Application Ser. No. 60/372,517 filed Apr. 12, 2002.

FIELD OF THE INVENTION

The present invention relates to an air manifold apparatus, and in particular, to an enclosed chamber for supplying pressurized air to a plurality of air lines extending therefrom.

BACKGROUND OF THE INVENTION

Air powered tools have long been utilized in the building and construction industry. As opposed to electricity, air powered tools utilize pressurized air by which to drive a motor provided in each tool. In order to utilize pressurized air as a power source, there, of course, must be a supply of pressurized air provided to the air powered tools. Such sources of pressurized air are typically provided by air compressors which provide a supply of pressurized air through an air hose. The air hose communicates with the air powered tool to drive the motor in the air powered tool and allow the air powered tool to perform its task.

At a construction or building site, several different air powered tools may be utilized by several different workers at the same time. This requires that several different air lines be provided in order to supply each air powered tool with pressurized air. In order that one air compressor may be utilized for several different air lines, air line splitters have been developed to distribute a common or single supply of pressurized air to a plurality of outlet air lines. The disadvantage with splitting an air line into multiple air lines is that the air compressor must engage and disengage more often in order to maintain a minimum level of pressurized air in the air lines. The increased amount of engagement and disengagement by the air compressor created by the air line being split may create excessive wear on the air compressor thereby raising the cost of maintaining the air compressor.

One known air line splitter design provides one inlet for receiving the supply of pressurized air and three outlets for distributing the pressurized air to three different air lines. The air line splitter has a tripod structure wherein the inlet to the air line splitter provides an aperture that maintains a coaxial relationship with the longitudinal axis of the air line splitter. The outlets of the air line splitter extend at the opposite end of the air line splitter from the inlet. Each outlet has an aperture with a longitudinal axis that is maintained at an acute angle from the longitudinal axis of the inlet. These air line splitters are commonly small and fabricated from hard, but typically brittle, materials, such as ceramics and plastics. Due to the rugged environment of most construction and building sites, these air line splitters are commonly cracked or broken, thereby requiring the need to replace the air line splitters. Quick release connectors or disconnects are typically sealed to the inlet and outlets of the air line splitters, and therefore, the quick release disconnects must be removed from the damaged air line splitter and resealed in a new air line splitter. The replacement of such air line splitters creates delays, costs and inefficiencies that are undesirable in the building and construction industries.

It would be desirable to design an air line splitter that would not be easily damaged under the rigors of a building or construction site and would not increase the wear on an air compressor.

SUMMARY OF THE INVENTION

The present invention relates to an air manifold apparatus for supplying pressurized air to at least one air line. The present invention provides an enclosure having at least one air inlet for receiving pressurized air from a pressurized air source and at least one air outlet for communicating pressurized air to at least one air line. The at least one air inlet and the at least one air outlet are each connectable to an air hose connector for communicating pressurized air between the enclosed chamber and the at least one air line. The present invention also includes means, extending from said enclosure, for protecting the at least one hose connector from structural damage. The protecting means may include at least one substantially rigid bar connected to and extending from the enclosure. The at least one bar may also act as a handle and/or a stand for the air manifold apparatus.

Other advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like referenced numerals refer to like parts throughout the several views and wherein:

FIG. 3 is a side view of the air manifold apparatus of the present invention.

FIG. 4 is a sectional view taken in the direction of arrows 4—4 in FIG. 2 of the air manifold apparatus of the present invention.

DETAILED DESCRIPTION OF THE INVENTION

Figure 1:
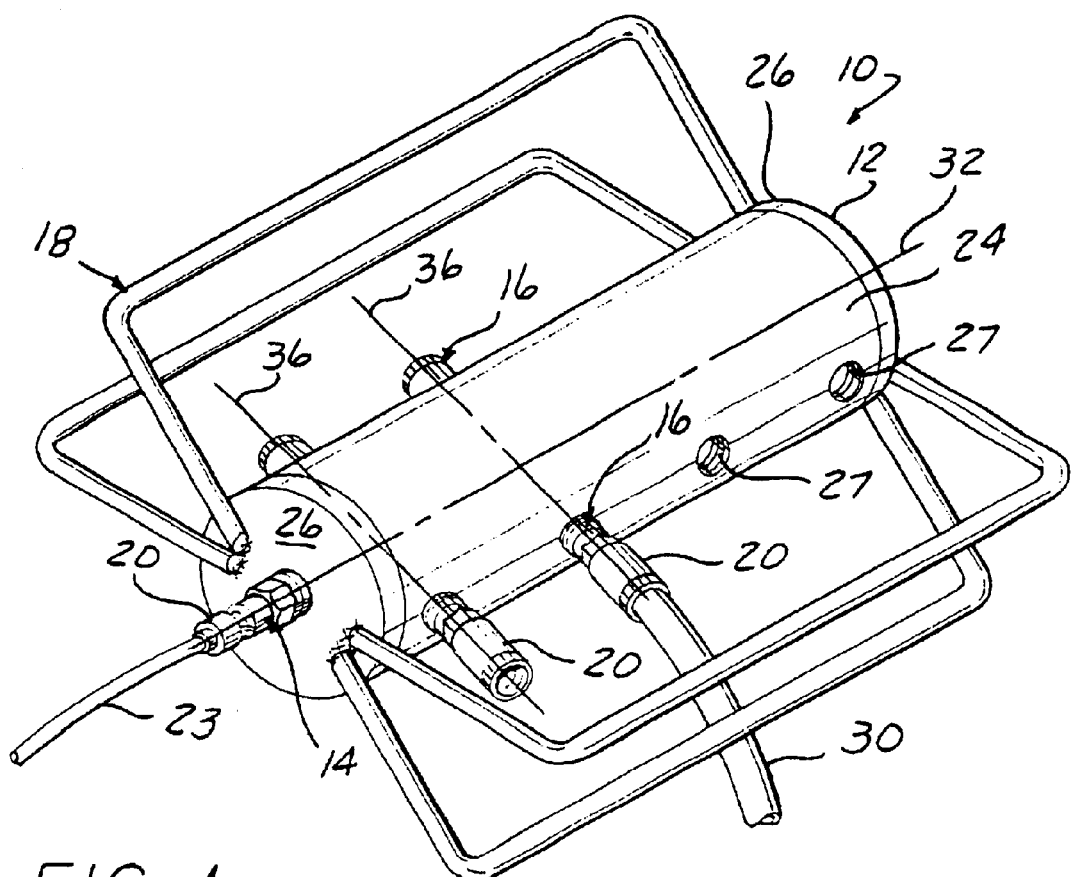
FIG. 1 is a perspective view of the air manifold apparatus of the present invention.
Figure 2:
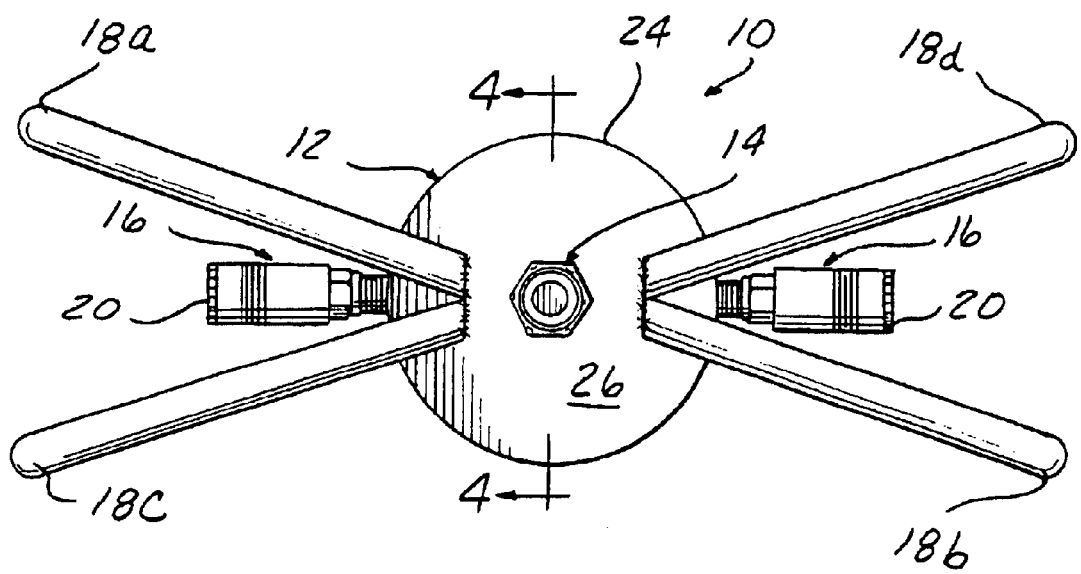
FIG. 2 is an end view of the air manifold apparatus of the present invention.

FIGS. 1 through 4 illustrate an air manifold apparatus 10 of the present invention. The air manifold apparatus 10 provides an enclosed chamber or enclosure 12 having an air inlet 14 for receiving pressurized air from a pressurized air source (not shown), such as an air compressor, and eight air outlets 16 for distributing pressurized air to a plurality of air powered tools (not shown). Such air powered tools may include drills, ratchets, nail guns, etc. and the like. It should be noted that the present invention is not limited to one air inlet 14 and eight air outlets 16, but rather, the present invention may provide for any number of air inlets 14 and air outlets 16 to satisfy any particular application. Four substantially cylindrical bars 18 are connected to the enclosed chamber 12 to protect air hose connectors 20 utilized to aid in communicating pressurized air to the air powered tools. The bars 18 are also utilized as a stand for lifting and securing the enclosed chamber 12 off the ground. In addition, the bars 18 may be utilized as a handle for lifting and transporting the air manifold apparatus 10 from one location to another. Although the present invention is ideally suited for four bars 18, the present invention may provide for any number of bars 18 that adequately protect the air hose connectors 20, as well as act as a stand and a handle for the air manifold apparatus 10.

To supply pressurized air to the air powered tools, the enclosed chamber 12 has a substantially cylindrical hollow body 24 and a pair of end caps 26 provided at each end of the body 24. The end caps 26 are welded to the body 24 to provide an airtight enclosure. Both the body 24 and the end caps 26 are fabricated from a metallic material, such as steel, but both the body 24 and the end caps 26 may be fabricated from any rigid material that can maintain the pressure levels provided by an air compressor, as well as endure the rigors associated with being utilized at construction and building environments.

In order to provide pressurized air to the enclosed chamber 12, the air inlet 14 provides a threaded aperture 22 in one of the end caps 26 of the enclosed chamber 12. The threaded aperture 22 receives one air hose connector 20 which in turn, is connected to a conventional air line or rubber hose 23. The air hose connector 20 is a conventional quick disconnect coupling having a male portion and a female portion. The female portion of the quick disconnect coupling 20 is threaded into and sealed in the threaded aperture 22 in end cap 26 so as to prevent any leakage of pressurized air from the enclosed chamber 12. When the male portion of the quick disconnect coupling 20 is removed from the female portion, the female portion seals the opening within the female portion of the coupling 20 to prevent the loss of pressurized air from the enclosed chamber 12. The air line 23 leading from the quick disconnect coupling 20 of the air inlet 14 leads to the air compressor which supplies pressurized air through the air line 23 to the air inlet 14 of the enclosed chamber 12. When the male and female portion of the quick disconnect coupling 20 are engaged, the coupling 20 is open, and pressurized air is allowed to flow from the pressurized air source to the enclosed chamber 12 through air line 23.

The quick disconnect couplings 20 of the air outlets 16 are similar to those provided in the air inlet 14 and are provided on opposite sides of the cylindrical body 24 of the enclosed chamber 12. Each of the quick disconnect couplings 20 of the air outlets 16 are threadingly received by threaded apertures 27 provided in the cylindrical body 24 of the enclosed chamber 12. The threaded portion of the quick disconnect couplings 20 are sealed to the threaded apertures 27 in order to prevent any leakage of pressurized air from the enclosed chamber 12. Each of the quick disconnect couplings 20 are connected to outlet air lines or rubber hoses 30 which lead to the air powered tools. The quick disconnect couplings 20 and corresponding apertures 27 provided in the body 24 of the enclosed chamber 12 are equally spaced along a longitudinal axis 32 of the enclosed chamber 12. Longitudinal axes 36 of the air outlets 16 are substantially perpendicular to the longitudinal axis 32 of the enclosed chamber 12. Four quick disconnect couplings 20 and apertures 27 are provided on each side of the cylindrical body 24 of the enclosed chamber 12. The quick disconnect couplings 20 are spaced to provide ease of access and a sufficient number of air outlets 16 for the air powered tools.

To protect the quick disconnect couplings 20 from damage, the bars 18 extend the length of the enclosed chamber 12 from opposite sides of the enclosed chamber 12. Each bar 18 is substantially similar by having an over-all substantially U-Shaped configuration and a substantially circular cross-section. Each of the bars 18 are fabricated from a metallic or substantially rigid material, such as steel, and the ends of the U-shaped bars 18 are welded to the end caps 26 to permanently secure the position of the bars 18. Bars 18a and 18b lie in a plane that intersects a plane formed by bars 18c and 18d. These planes intersect at the longitudinal axis 32 of the enclosed chamber 12. Thus, bars 18a and 18c and bars 18b and 18d extend outward from the enclosed chamber 12 at acute angles with respect to one another.

The bars 18 generally extend along the area occupied by the quick disconnect couplings 20 of the air outlets 16. This configuration established by the bars 18 works to protect the quick disconnect couplings 20 and/or the air outlets 16 from any damage that may be associated with larger items falling on the quick disconnect couplings 20 or the air outlets 16 or workers stepping on or driving a vehicle on the quick disconnect couplings 20 or the air outlets 16. The position of the bars 18 also works to act as a stand for the air manifold apparatus 10 by setting two of the bars 18 on the ground or a surface, thereby allowing the bars 18 to raise the enclosed chamber 12 off the ground or surface. This provides easier access to the quick disconnect couplings 20 by allowing a user to easily wrap his hand around the quick disconnect couplings 20. Lastly, the strength of the bars 18 provide easy handles by which a user may lift, carry and relocate the air manifold apparatus 10 to another location.

In operation, the air line 23 leading from the air compressor is connected to the air inlet 14 through the use of one of the quick disconnect couplings 20. The air lines 30 leading from the enclosed chamber 12 to the air powered tools are connected by the quick disconnect couplings 20 at the air outlets 16 of the enclosed chamber 12. Once the air lines 23, 30 are in place, the air compressor is engaged so as to provide a supply of pressurized air to the enclosed chamber 12. The enclosed chamber 12 is pressurized with pressurized air, thereby providing a ready supply of pressurized air to the air powered tools. Once the enclosed chamber 12 reaches an upper predetermined level of pressurized air, the air compressor disengages until the level of pressurized air reaches a lower predetermined level in which the air compressor engages to raise the pressure level to the upper predetermined level. The enclosed chamber 12 works as a secondary holding tank or surge protector to the outlet air lines 30 thereby reducing the amount of times the air compressor must engage and disengage. This aids in reducing the wear on the air compressor, thereby enhancing the life of the air compressor.

While the invention has been described in connection with what is presently considered the most practical and preferred embodiment, it is to be understood that the invention is not to be limited to the disclosed embodiments, but to the contrary, is intended to cover various modifications and equivalent arrangements included with the spirit and scope of the appended claims, which scope is to be accorded the broadest interpretation so as to encompass all such modifications and equivalent structures as is permitted under the law.

What is claimed is:

1. An air manifold apparatus for supplying pressurized air to a plurality of air lines, comprising:

an enclosure having opposite ends and an air inlet for receiving said pressurized air from a pressurized air source and a plurality of air outlets for communicating said pressurized air to said plurality of air lines;

said air inlet and said air outlets each connectable to an air hose connector for communicating said pressurized air between said enclosure and said air lines; and a plurality of bars connected to said opposite ends of said enclosure and extending outwardly away from said enclosure wherein said air hose connectors extend between said bars to protect said air hose connectors from damage and to act as a handle and a stand for said air manifold apparatus.

2. The air manifold apparatus stated in claim 1, further comprising:

means, extending from said enclosure, for supporting said enclosure from a surface.

3. The air manifold apparatus stated in claim 1, further comprising:

means extending from said enclosure for carrying said enclosure.

4. The air manifold apparatus stated in claim 3, wherein said means for carrying further comprises:

at least one substantially rigid bar connected to and extending from said enclosure.

5. The air manifold apparatus stated in claim 1, further comprising:

said enclosure fabricated from a rigid material.

6. The air manifold apparatus stated in claim 1, further comprising:

said enclosure having a substantially cylindrical configuration.

7. An air manifold apparatus for supplying pressurized air to a plurality of air lines comprising:

a substantially cylindrical enclosure having opposite ends;

an air inlet positioned at one of said opposite ends of said enclosure for communicating said pressurized air from a pressurized air source to within said enclosure;

a plurality of air outlets formed in said enclosure for communicating said pressurized air from within said enclosure to said plurality of air lines;

a plurality of air hose connectors connected to said air inlet and said plurality of air outlets for communicating said pressurized air between said enclosure and said plurality of air lines; and a plurality of bars connected to said opposite ends of said enclosure and extending outwardly away from said enclosure wherein said air hose connectors extend between said bars to protect said plurality of air hose connectors from damage and to act as a handle and a stand for said air manifold apparatus.

8. The air manifold apparatus stated in claim 7, further comprising:

said enclosure fabricated from a metallic material.

9. The air manifold apparatus stated in claim 7, further comprising:

said plurality of bars being substantially U-shaped.

10. The air manifold apparatus stated in claim 7, further comprising:

said plurality of bars being substantially cylindrical.

11. The air manifold apparatus stated in claim 7, further comprising:

said enclosure having a longitudinal axis, and each of said plurality of air outlets of said enclosure having a longitudinal axis wherein said longitudinal axis of said enclosure is substantially perpendicular to said longitudinal axes of said plurality of air outlets.

12. An air manifold apparatus for supplying pressurized air to a plurality of air lines comprising:

a substantially cylindrical enclosure having opposite ends, wherein each of said ends has an end cap connected thereto;

an air inlet positioned in one of said end caps for communicating said pressurized air from a pressurized air source to within said enclosure;

a plurality of air outlets formed in said enclosure for communicating said pressurized air from within said enclosure to a plurality of air lines;

a plurality of air hose connectors threadingly connected to said air inlet and said plurality of air outlets for communicating said pressurized air between said enclosure and said plurality of air lines; and a plurality of substantially U-shaped bars connected to said end caps of said enclosure and extending outwardly away from said enclosure wherein said air hose connectors extend between said bars to protect said plurality of air hose connectors from damage and to act as a handle and a stand for said air manifold apparatus.

13. The air manifold apparatus stated in claim 12, further comprising:

said enclosure, said end caps, and said bars fabricated from steel.

14. The air manifold apparatus stated in claim 12, further comprising:

said plurality of bars being substantially cylindrical.

15. The air manifold apparatus stated in claim 12, further comprising:

said plurality of air outlets being axially spaced along a longitudinal axis of said enclosure.

16. The air manifold apparatus stated in claim 12, further comprising:

said plurality of bars welded to said end caps.

17. An air manifold apparatus for supplying pressurized air to a plurality of air lines comprising:

a substantially cylindrical enclosure having opposite ends, wherein each of said ends has an end cap connected thereto;

an air inlet positioned in one of said end caps for communicating said pressurized air from a pressurized air source to within said enclosure;

a plurality of air outlets formed in said enclosure for communicating said pressurized air from within said enclosure to a plurality of air lines;

a plurality of air hose connectors threadingly connected to said air inlet and said plurality of air outlets for communicating said pressurized air between said enclosure and said plurality of air lines;

a plurality of substantially U-shaped bars connected to said end caps of said enclosure and extending outwardly away from said enclosure to protect said plurality of air hose connectors from damage and to act as a handle and a stand for said air manifold apparatus; and two pairs of bars, wherein each of said pair of bars extends from opposite sides of said enclosure, and each bar of each of said pair of bars extends outwardly at an acute angle with respect to said other bar of each of said pair of bars.

18. An air manifold apparatus for supplying pressurized air to a plurality of air lines comprising:

a substantially cylindrical enclosure having opposite ends, wherein each of said ends has an end cap connected thereto;

an air inlet positioned in one of said end caps for communicating said pressurized air from a pressurized air source to within said enclosure;

a plurality of air outlets formed in said enclosure for communicating said pressurized air from within said enclosure to a plurality of air lines;

a plurality of air hose connectors threadingly connected to said air inlet and said plurality of air outlets for communicating said pressurized air between said enclosure and said plurality of air lines;

a plurality of substantially U-shaped bars connected to said end caps of said enclosure and extending outwardly away from said enclosure to protect said plurality of air hose connectors from damage and to act as a handle and a stand for said air manifold apparatus;

a first pair of bars extending along a first plane;

a second pair of bars extending along a second plane; and said first and second planes intersecting at an acute angle with respect to one another.

19. The air manifold apparatus stated in claim 18, further comprising:

said first and second planes intersecting along a longitudinal axis of said enclosure.

\* \* \* \* \*